United States Patent [19]
Dunn et al.

[11] Patent Number: 6,139,401
[45] Date of Patent: Oct. 31, 2000

[54] METHOD OF CORRECTING THE IMBALANCE OF A PNEUMATIC TIRE WITH A TIRE UNIFORMITY MACHINE

[75] Inventors: William Frank Dunn, Stow; John Michael Maloney, Medina; George Jeffrey Lipczynski, Hudson, all of Ohio

[73] Assignee: The Goodyear Tire & Rubber Company, Akron, Ohio

[21] Appl. No.: 09/180,048
[22] PCT Filed: Oct. 15, 1996
[86] PCT No.: PCT/US96/16355
§ 371 Date: Oct. 29, 1998
§ 102(e) Date: Oct. 29, 1998
[87] PCT Pub. No.: WO98/16810
PCT Pub. Date: Apr. 23, 1998

[51] Int. Cl.[7] .................................................. B24B 49/00
[52] U.S. Cl. ................................ 451/10; 451/11; 451/49; 451/254; 451/258
[58] Field of Search ................................... 451/8, 10, 11, 451/49, 54, 254, 258

[56] References Cited

U.S. PATENT DOCUMENTS 3,739,533  6/1973  Iida et al. .
3,946,527  3/1976  Beer .
4,041,647  8/1977  Ugo .
4,173,850  11/1979  Gormishi et al. .
4,837,980  6/1989  Rogers, Jr. .
4,912,882  4/1990  Makino et al. .
4,914,869  4/1990  Bayonnet et al. .
5,263,284  11/1993  Wild .

FOREIGN PATENT DOCUMENTS 44 36 200  4/1996  Germany .

Primary Examiner—Timothy V. Eley
Attorney, Agent, or Firm—Howard M Cohn

[57] ABSTRACT

A method for correcting the balance of a pneumatic tire mounted in a tire uniformity machine modified for balance screening such tires. After balance screening of the tires, tires which are unacceptably imbalanced are maintained at the second rotational speed of the balance screening routine. A grinding wheel is brought to the position of maximum radial and/or lateral deflection causing tire material to be removed from deflected portions of the tire. The tire is once again balance checked and if the balance is still unacceptable, the grinder is advanced an incremental unit of distance toward the center of the tire, more tire material is removed, and the balance is again checked. The steps of advancing the grinder, removing material, and checking the tire imbalance are performed until the tire is found to have acceptable static and couple imbalance. Another aspect of the invention is to grind a tire on a tire uniformity machine to bring the tangential force variations to within an acceptable degree of tangential force variation.

28 Claims, 7 Drawing Sheets

METHOD OF CORRECTING THE IMBALANCE OF A PNEUMATIC TIRE WITH A TIRE UNIFORMITY MACHINE

FIELD OF THE INVENTION

This invention relates to the field of pneumatic tire balancing, and more particularly, to a method for correcting the balance of pneumatic tires using a tire uniformity machine.

BACKGROUND OF THE INVENTION

In the art of manufacturing pneumatic tires, rubber flow in the mold or minor differences in the dimensions of the belts, beads, liners, treads, plies of rubberized cords, etc., sometimes cause non-uniformities in the final tire. When non-uniformities are of sufficient magnitude, they will cause a tire to be imbalanced. Regardless of its cause, when the imbalance exceeds an acceptable maximum amount, the ride of the vehicle to which such an imbalanced tire is mounted will be adversely affected.

Essentially, two separate physical phenomena contribute to the imbalance of a tire, static imbalance and couple imbalance. Static imbalance is the result of net centrifugal forces created by non-uniformities in the distribution of tire mass about the rotational axis of the tire. Non-uniformity of tire mass distribution is caused by manufacturing variations which create mass distribution differences about the radius of the tire tread. As an element of tire mass rotates about an axis, centrifugal force is experienced by the element, which tends to push it away from the center of rotation, the magnitude of this centrifugal force being:

$$F = m \times \omega^2 \times r$$

wherein m=mass of the element, $\omega$=rotational velocity, and r=radius of the circle of rotation. If the mass of the tire is distributed equally about the center of rotation, the centrifugal force on each of the elements of tire mass would be negated by an equal and opposite force acting upon an element of tire mass located on the opposite side of the center of rotation, and thus no net centrifugal force would act upon the tire during rotation. However, when the distribution of tire mass is nonuniform, so that there are elements of greater mass or elements located at greater radial distance from the center of rotation, the centrifugal force on these elements is not canceled by the opposing force acting on the element of tire mass located on the opposite side of the center of rotation. In such cases, the tire experiences a net centrifugal force acting through the element of either greater tire mass or located at a greater distance from the center of rotation. These net centrifugal forces cause a static imbalance about the center of rotation of the tire.

Couple imbalance is caused by the above described mass distribution non-uniformities, or mass imbalances, about the radius of the tire which create net moments about an axis in a plane which is through the centerline of the tread radius and perpendicular to the axis of rotation of the tire. The magnitude of such a moment equals the net force acting on the mass non-uniformity, or the imbalance force, multiplied by the distance of the mass non-uniformity from the centerline of the tread (and thus the axis located in the plane through the tread centerline). This moment can be expressed as:

$$M = F \times d = (m \times \omega^2 \times r) \times d$$

wherein variables m, $\omega$, and r are the properties described above and d=distance between the mass non-uniformity and the centerline of the tread. The effect of such moments is that the tire tends to wobble along its axis of rotation. Couple imbalance is usually caused by mass distribution differences about the circumference of the tire, between the upper and lower plane, the planes being parallel and equally spaced from the plane through the centerline of the tread.

The combined effect of the static imbalance and the couple imbalance is referred to as the dynamic imbalance of a tire, which is the total imbalance experienced by a rotating tire. As static imbalance and couple imbalance are two distinct and mutually independent physical phenomena, the dynamic behavior of a rotating tire can be analyzed by overlaying the effect of static imbalance on the effect of couple imbalance. Virtually all tires have some differences in the distribution of the tire mass which causes dynamic imbalance to be present, but the imbalance will be negligible, or at least acceptable, in a uniform tire.

Among several force variations which cause problems with tire performance is tangential force variation, or fore-aft force variation which is experienced at the surface of contact between tire and road surface in a direction both tangential to the tire tread and perpendicular to the tire axis of rotation. Tangential force variations are very speed dependent and are experienced as "push-pull" effect on a tire, which can be analogized to the sensation of a wheel barrow traveling over a bump in the road, i.e. increased force as the wheel barrow is pushed up the bump and decreased force as the wheel barrow travels down the bump. Investigations have shown that there are multiple mechanisms active in causing tangential force variation. However, to date, the tangential force variation is essentially unmeasurable on a typical production low speed tire uniformity machine, as discussed in more detail below, which operates at a speed, such as 60 revolutions per minute (RPM). Instead, tangential force variation can only be measured at highway speed or above, using a high speed laboratory tire uniformity machine, such as a Model HSU-1064, available from the Akron Standard Co. of Akron Ohio. Because of the low productivity and expense of the laboratory tire uniformity machine, the tangential force variation parameter can only be measured by sample methods.

In the usual tire manufacturing process, tires are placed first in a production tire uniformity machine to correct force variation and then placed in a tire balance machine to measure time imbalance. Sufficiently large non-uniformities in a tire will cause, besides imbalance and tangential force variations as outlined above, other force variations on a surface, such as a road, against which the tires roll. These force variations produce vibrational and acoustical disturbances in the vehicle upon which the tires are mounted, and when such variations exceed an acceptable maximum level, the ride of a vehicle utilizing such tires will be adversely affected.

Consequently, there have been a number of methods developed to correct excessive force variation by removal of rubber from the shoulders and/or the central region of the tire tread by means such as grinding. Most of these correction methods include the steps of indexing the tire tread into a series of circumferential increments via computer control and obtaining a series of force measurements representative of the force exerted by the tire as these increments of tire tread contact a surface. This data is then interpreted and rubber is removed from the tire tread in a pattern generated by this interpretation.

Force variation correction methods are commonly performed with a production tire uniformity machine (TUM), which includes an assembly for rotating a test tire against the surface of a freely rotating loading wheel. In such an arrangement, the loading wheel is moved in a manner dependent on the forces exerted by the rotating tire and those forces are measured by appropriately placed measuring devices. When a tire being tested yields less than acceptable results, shoulder and center rib grinders are used to remove a small amount of the tire tread at precisely the location of non-uniformities detected by the measuring devices. As the tire is rotated, it is measured and ground simultaneously. In a sophisticated, low speed production tire uniformity machine, such as a Model No. D70LTX available from the Akron Standard Co. of Akron Ohio, the force measurements are interoreted by a computer and rubber is removed from the tire tread using grinders controlled by the computer. Examples of tire uniformity machines utIlizing these methods are disclosed in U.S. Pat. Nos. 3,739,533, 3,946,527, 4,914,869, and 5,263,284. Another tire uniformity machine utilizing similar methods is disclosed in U.S. Pat. No. 4,914,869, published on Apr. 10, 1990 and entitled METHOD FOR CORRECTING AND BUFFING TIRES. DE-A-4,436,200 published on Apr. 18, 1996 discloses a machine for grinding a tire.

Once a tire undergoes correction for force variations in a TUM, it is common manufacturing practice to remove the tire from the TUM and place the tire in a balance machine to measure the amount of imbalance of the tire. Typically, the tires are mounted in the balance machine in a manner similar to that of the tire uniformity machine and inflated to a preset pressure. Then, the static and couple imbalances are measured by one of a variety of well-known methods. When a tire is found to be imbalanced to an unacceptable level, the tire is ordinarily scrapped. In present, state-of-the-art tire manufacturing processes, the great majority of the tires measured have acceptable amounts of imbalance. Still, with the huge volume of tires produced annually, there are still a significant number of tires which are scrapped in the current manufacturing processes resulting significant waste of material and resources.

Because of the increased awareness of environmental and financial concerns, it has become increasingly important to find a means to correct the imbalance of tires found to be unacceptably imbalanced. Moreover, with improved drive suspensions and lighter automobiles, the requirement to correct for tangential force variation is expected to become a reality in the foreseeable future.

OBJECTS OF THE INVENTION

It is an object of the present invention to provide a method for correcting the imbalance of pneumatic tires on a tire uniformity machine.

It is a further object of the present invention to provide a method of correcting the imbalance of pneumatic tires on a tire uniformity machine which includes the steps of balance checking the tire to determine the degree of tire imbalance, then incrementally grinding the imbalanced tire, and balance checking after each incrementally grind until the tire is within acceptable limits of imbalance.

An even further object of the present invention is to eliminate the need to scrap all tires which are found to be outside the acceptable limits of imbalance.

Still another object of the present invention is to grind a tire on a tire uniformity machine to bring the tangential force variations to within a desired range.

Other objects of this invention will be apparent from the following description and claims.

SUMMARY OF THE INVENTION

In accordance with the present invention, there is provided a method of balance correcting a tire with a tire uniformity machine. After a tire, mounted in a tire uniformity machine has undergone any grinding to correct force variations, the air pressure in the tire is reduced and the rotation speed of the tire is increased. Then the tire undergoes a balance screening routine to evaluate the static and dynamic imbalance. If found to be imbalanced to an unacceptable level, a grinder is positioned near the tire so that a grinding wheel of the grinder is located slightly closer to the tire center than the maximum tire radial and lateral run-out as determined during the balance screening routine. Contact between tire and grinding wheel results in the removal of tire material at tire positions which are forced outward from the tire center due to centrifugal forces caused by static and dynamic imbalance. After removal of the material, the balance is again evaluated and if the tire is still above the limits for acceptable imbalance, the grinder is advanced an incremental unit of distance towards the center of the tire. After material is removed at the second position, the balance of the tire is evaluated once again. The steps of advancing the grinder an incremental unit of distance, removing material at the advanced grinder position, and re-evaluating the balance of the tire after grinding are repeated until the tire is found to have acceptable imbalance.

It is also within the scope of the invention to grind a tire on a tire uniformity machine to lower the tangential force variation to an acceptable level.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 2, are detailed views of a radial run-out sensor as positioned for static imbalance evaluation;

FIG. 3, are detailed views of a lateral run-out sensor as positioned for couple imbalance evaluation;

DETAILED DESCRIPTION OF THE INVENTION

Figure 1:
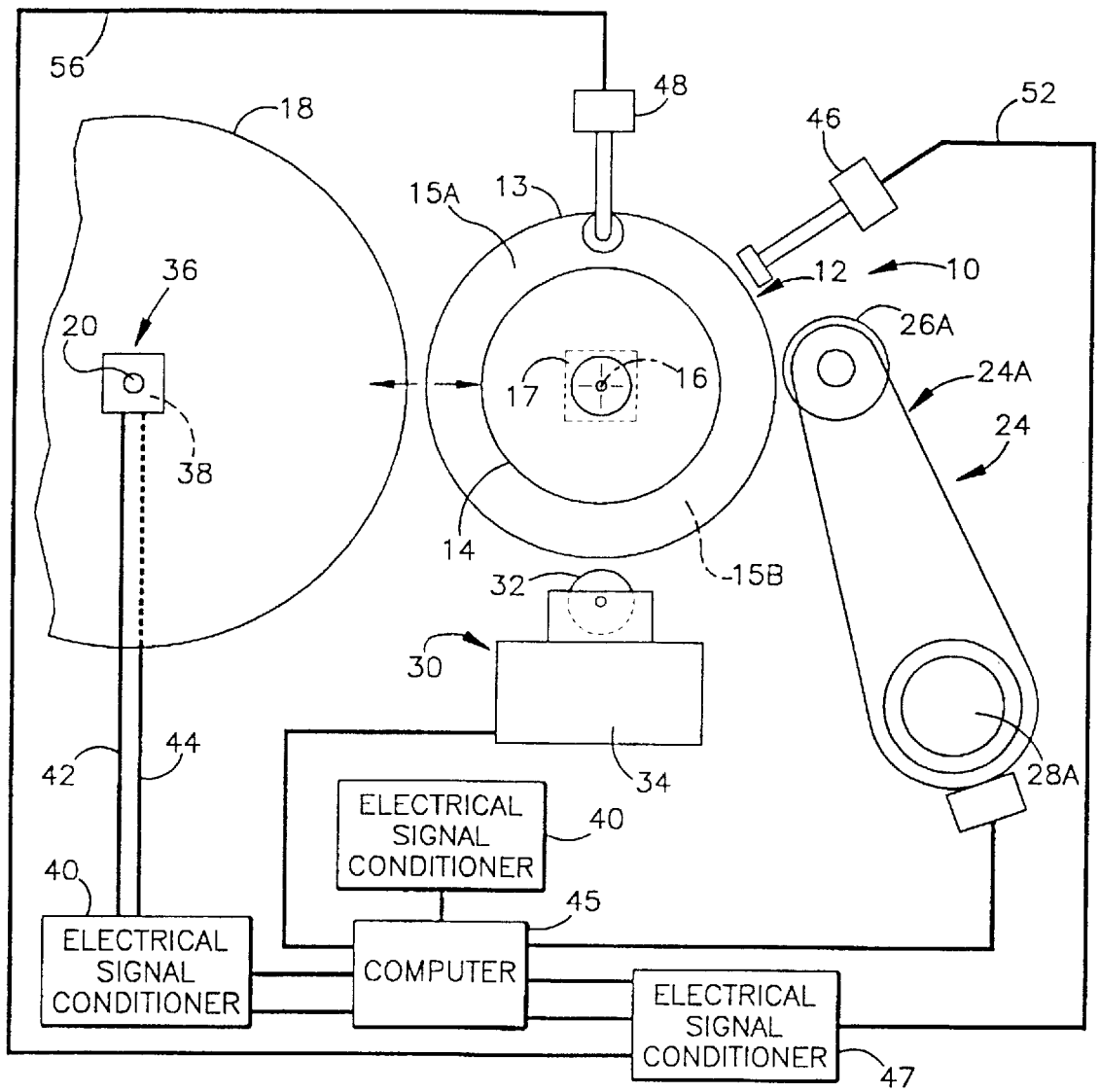
FIG. 1 is a schematic illustration of a force variation machine adapted for balance checking and balance correcting tires with a tire mounted thereon in accordance with the invention.
Figure 2A:
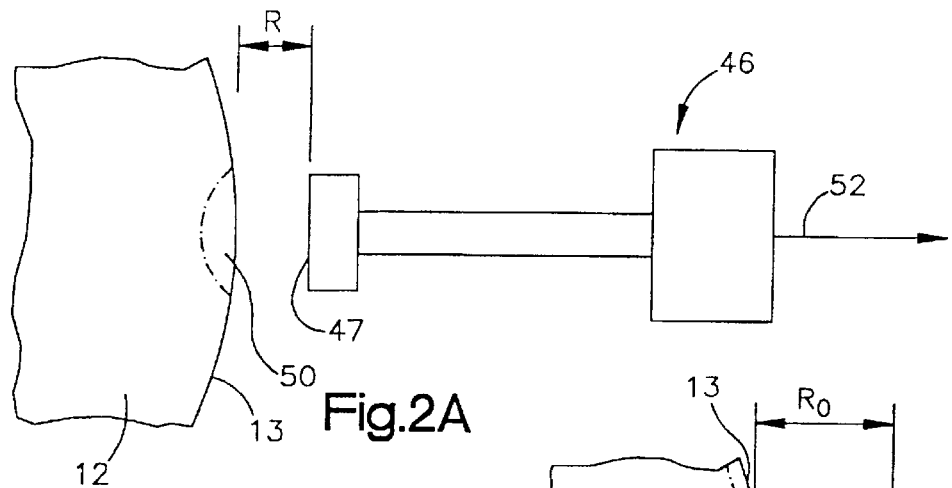
FIGS. 2A and 2B, collectively
Figure 2B:
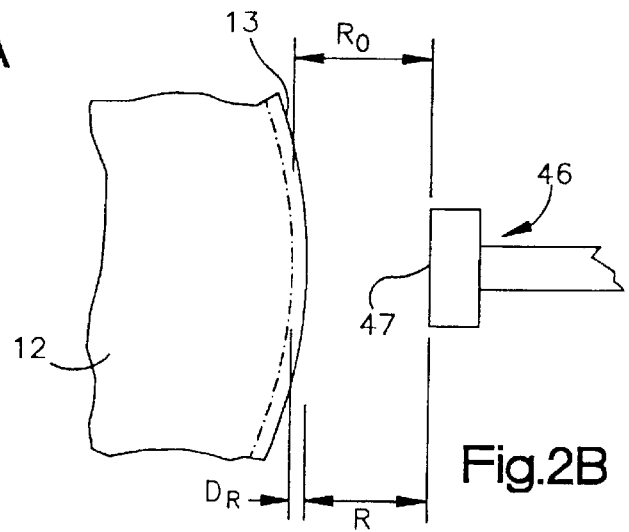

Referring to FIGS. 1 and 2, there is illustrated a typical tire uniformity machine (TUM) 10, also known as a force variation machine (FVM), adapted for balance screening a tire 12 mounted within the machine. Tire 12 is typically a pneumatic tire having a circumferential tire tread 13, with top and bottom shoulder regions and a central region between the top and bottom shoulder regions, and sidewalls 15A,15B. The tire 12 can be mounted on a rim 14 secured to a tire spindle 16 and inflated to a desired pressure. A variable speed motor 17, shown with phantom lines, rotates the tire spindle 16 and rim 14. The tire 12 can be placed under load by a load wheel 18, which is rotatably supported on a spindle 20 extending through the load wheel. During the testing of the tire for non-uniformities, the load wheel 18 is pressed against the tire to load the inflated tire with a specified force (for example, 600 to 1900 lb) to simulate road conditions. The tire, which is pressed against load wheel 18, is rotated with tire spindle 16 by motor 17. Bearing blocks (not shown) are mounted to the ends of the load wheel spindle 20 and are moved by conventional means, such as an electric motor (not shown) operating through a ball-and-screw connection, to move the load wheel 18 into and out of engagement with the tire 12. A shoulder grinding assembly 24 is located substantially 180° with respect to tire 12 from load wheel 18. The shoulder grinding assembly 24 includes substantially identical top and bottom shoulder grinders (only 24A is illustrated and described), which include grinding wheels that are powered by motors and are independently moved into and out of engagement with the shoulder regions of tire 12. As shown, the top shoulder grinder 24A, including a grinding wheel 26A powered by a motor 28A, can be moved into and out of engagement with the shoulder portions of tire 12 by any conventional means, such as an hydraulic servo device (not shown). A center grinder assembly 30 is located adjacent wheel 12 approximately 90° counter-clockwise about tire 12 from load wheel 18. The center grinder assembly 30 has a grinding wheel 32 that is powered by a motor 34 and is moved into and out of engagement with the central region of the tread of tire 12 by conventional means, such as with an hydraulic servo device (not shown).

Conventional radial and lateral load cells 36 and 38, i.e., two-axis strain gauge load cells, are mounted between the opposite ends of spindle 20 and the machine carriage (not shown) with load wheel 18 suspended there between. The radial and lateral load cells 36,38 are typically used to measure the lateral and radial forces transmitted from the tire 12 as it rotates against the load wheel 18. Each of the load cells 36,38 includes a lateral load cell section conventionally used to measure the lateral force exerted by the tire 12 against load wheel 18 in a direction parallel to the axis of rotation extending about which the load wheel rotates. The load cells 36,38 also include a radial load cell section conventionally used to measure the radial force at the point of intersection of the tire 12 and the load wheel 18 exerted by the tire 12 against the load wheel 18 and through spindle 20 about which the load wheel rotates.

Voltage signals, proportionate to the magnitude of the radial and lateral forces, are generated by load cells 36,38 and inputted through lines 42 and 44, respectively, into an electric signal conditioner 40, which converts the force measurement voltage signals generated by the load cells 36,38 into signals which can be inputted to and stored in a computer 45. The electric signal conditioner 40 includes radial top and lateral top amplifiers (not shown) connected by line 44 to load cell 38 and radial bottom and lateral bottom amplifiers (not shown) connected by line 42 to load cell 36.

Computer 45, is conventionally programmed to determine the conicity, lateral force values, radial run-out, and radial force values of the tire 12, and to control the corrective grinding action to take. The computer controls the shoulder grinding assembly 24 and to the center grinder assembly 30 to position and operate the grinding assemblies, as required.

Essential to the preferred embodiment of the present invention is the method of balance screening a pneumatic tire on a tire uniformity machine 10. A standard tire uniformity machine 10, as described above, has the capability of balance screening a pneumatic tire 12 deflated to a low pressure of about 2 psig. to about 10 psig with the radial run-out sensor 46 and the lateral run-out sensor 48. The sensors 46 and 48 are adjustably mounted to tire uniformity machine 10 and connected through electrical cables 52 and 56, respectively, to an electrical signal conditioner 47 which converts the measured voltage signals generated by sensors 46 and 48 into signals which are then inputted into computer 45. While the electrical signal conditioner 47 is illustrated as being physically located outside of computer 45, it is within the scope of the invention to condition the signals, as needed, within the computer. Referring to FIGS. 1 and 2, radial run-out sensor 46 is preferably movably mounted by conventional means (not shown) to machine 10 in a manner which enables sensing face 47 of sensor 46 to be securely located at a fixed position in near proximity to the center of circumferential tread 13 of tire 12 and also enables adjustment of the location of sensing face 47 to allow for balance screening of tires of different diameters. In the preferred embodiment, radial run-out sensor 46 is a commercially available, no-contact probe, that is most desirable for the high operating speeds preferred. However, it is within the scope of the present invention to use other means for radial run-out sensor 46, such as a mechanical contact probe, in which case radial run-out sensor 46 would be mounted to tire uniformity machine 10 in a manner which enabled sensing face 47 to physically contact a circumferential tread 13 of tire 12 during balance screening.

Radial run-out sensor 46 senses a target are a 50, see FIG. 2A, on the center of circumferential tread 13 of tire 12, previously deflated to a low pressure, as the circumferential tread rotates past the fixed position of the radial run-out sensor. The radial run-out sensor 46 measures the distance R between the sensing face 47 and the target area 50 on circumferential tread 13. Target area 50 is preferably a circular area on the surface of tread 13 which is sufficiently large so as not to be affected by the height differences of the tread pattern. Radial run-out sensor 46 generates voltage signals which are proportional to distance R. These signals are sent from the radial run-out sensor 46, through electrical cable 52 to electrical signal conditioner 47 and then to computer 45. Distance R will be designated as reference distance $R_o$ for one revolution of deflated tire 12 at a low speed. When there is static imbalance in the tire 12, the resulting deflections of circumferential tread 13 caused by the net centrifugal forces acting on the tread wall will cause variations in distance R in proportion to the speed of rotation of tire 12. The resulting variations of distance R, or radial deflection $D_R$, are determined (preferably by the computer 45) by subtracting the measured distance R from reference distance $R_o$.

Figure 3A:
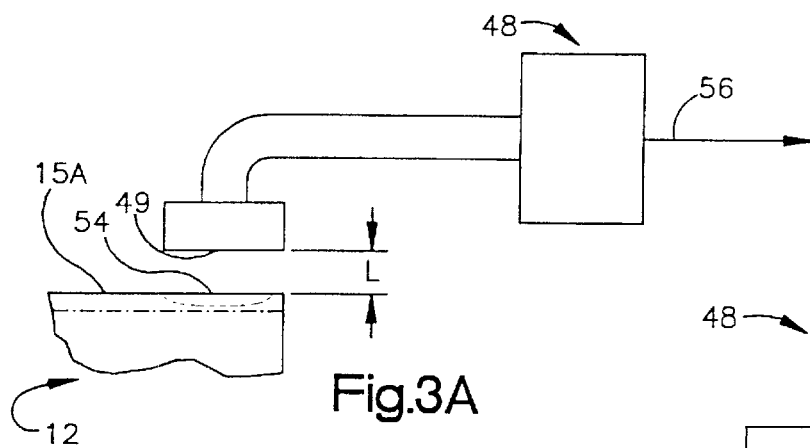
FIGS. 3A and 3B, collectively
Figure 3B:
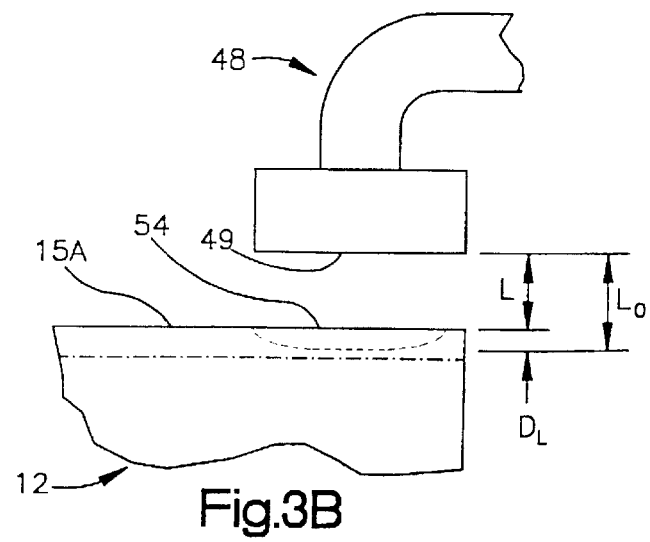

Referring to FIGS. 1 and 3, a lateral run-out sensor 48 is preferably adjustably mounted by conventional means (not shown) to tire uniformity machine 10 in a manner which enables sensing face 49 of sensor 48 to be located at a fixed position in near proximity to one sidewall 15, preferably 15A, of tire 12 and also enables adjustment of the location of sensing face 49 to allow for balance screening of tires of different widths. In the preferred embodiment, lateral run-out sensor 48 is a commercially available no-contact probe, as a no-contact probe is most desirable for the high operating speeds preferred. However, it is within the scope of the present invention to use other means for lateral run-out sensor 48, such as a mechanical contact probe, in which case lateral run-out senor 48 would be mounted to tire uniformity machine 10 in a manner which enabled sensing face 49 to physically contact a sidewall 15 of tire 12 during balance checking.

Lateral run-out sensor 48 senses a target area 54, typically a circular area on the outer surface of sidewall 15 of a tire 12 as the centerwall rotates past the fixed position of the lateral run-out sensor. The lateral run-out sensor 48 measures the distance L between the sensing face 49 and the target area 54 on the outer surface of sidewall 15. Lateral run-out sensor 48 generates voltage signals which are proportional to distance L. These voltage signals are sent from the lateral run-out sensor 48 through electrical cable 56 to electrical signal conditioner 47 and then to computer 45. Distance L will be designated as reference distance $L_o$ for one revolution of deflated tire 12 at low speed. When there is couple imbalance in the tire 12, the distance L will vary as a function of the speed of rotation of tire 12 resulting in "wobble" or movement along the axis of rotation. The resulting variations of distance L, or lateral deflections $D_L$, are determined (preferably by the computer 45) by subtracting the measured distance L from the reference distance $L_o$. While a single lateral run-out sensor 48 is illustrated, it is also within the terms of the invention to incorporate two lateral run-out sensors, adjacent to opposite sidewalls of tire 12.

To enable the tire uniformity machine 10 to measure the amount of static imbalance force or couple imbalance moment acting on a tire, the computer 45 is programed to correlate both the measured radial deflection $D_R$ to the static imbalance force and the measured lateral deflection $D_L$ to the couple imbalance moment. The radial deflection $D_R$ and the lateral deflection $D_L$ are proportional to static imbalance force and couple imbalance moment, respectively, by different factors. Furthermore, the correlation between the radial deflection $D_R$ and the lateral deflection $D_L$ and the imbalance force or couple imbalance moment, respectively, which causes it will be different for tires of different sizes, geometries, material properties, etc. Therefore, there is a first factor correlating radial deflection to static imbalance force, and a second factor correlating lateral deflection to couple imbalance moment, for each tire size within each class of tire. Once all these correlation factors are empirically determined and stored within computer 45, tire uniformity machine 10 can then balance screen any desired tire by the method outlined hereinafter.

To determine these correlation factors, a series of tests are conducted for each size tire of each class of tire to be balance screened on the tire uniformity machine 10. For a particular tire size of a particular class, a tire 12 undergoes a series of trials to empirically calibrate both the radial run-out sensor 46 and lateral run-out sensor 48 for that particular type of tire. For example, to calibrate the radial run-out sensor 46, a number of trials are conducted wherein, for each trial, an amount of known weight is attached at a known location on the inside centerline of circumferential tread 13. The tire is deflated to a minimum pressure of up to about 10 psig. and preferably up to about 5 psig., so that the tire beads are seated to the rim 14. The tire is then rotated at a low speed of less than 100 rpm. Then, the distance R between the sensing face 47 and the target area 50 on the surface of circumferential tread 13 is measured with the radial run-out sensor 46. The distance R, measured when the load of known weight is attached to the tire, is subtracted from a reference distance $R_o$ measured on a balanced tire without the load, to calculate the radial deflection $D_R$ caused by the load of known weight. The static imbalance force caused by the load is easily calculated by the method using the formula $$F = m \times \omega^2 \times r$$

as discussed in the Background of the Invention. The result of this calculation is an empirically derived correlation factor which correlates a measured deflection to an amount of static imbalance force, the static force-radial deflection correlation factor $F_{CF}$. To ensure accuracy of the empirically derived correlation factor $F_{CF}$, a number of tests are typically conducted for each tire type. In these tests, the amount of known weight is incrementally increased or decreased for each test run. The result is a corresponding increase or decrease in the amount of measured radial deflection $D_R$. Then, the static force-radial deflection correlation factor $F_{CF}$ for that type of tire would be the average of all the empirically derived correlation factors $F_{CF}$, which is approximately or exactly the same from each test.

Because the circumferential forces at high rotational speeds cause the rubber to experience "growth", a correlation factor derived at a low speed would overestimate the imbalance force at high speed because some of the measured change in radial distance R will be caused by this rubber growth in addition to the deflection due to static imbalance force. Therefore, the basic test procedure outlined above should be conducted at the desired operational high rotation speed resulting in a correlation factor that is necessarily smaller then one determined at a low rotational speed (i.e., a known weight will cause greater measured deflection at high speed due to the effect of rubber growth). The static force-radial deflection correlation factor $F_{CF}$ is then stored in the computer 45 for each type of tire 12 to enable the computation of the static imbalance forces acting upon a tire being tested by measuring the radial deflections $D_R$ about the circumference of the tire. In the usual case, the static force-radial deflection correlation factor $F_{CF}$ will be expressed as a number of pounds or ounces of static imbalance force per so many thousandths of an inch of radial deflection.

To calibrate the lateral run-out sensor 48, the same basic procedure is used, except that two weights are added for each test. These two weights of known magnitude, are located 180° from each other as measured about the circumference of the tire and disposed equidistant. from, and on opposite sides of, the tire tread centerline. The result of a series of these tests will be a couple moment-lateral deflection correlation factor $M_{CF}$ for each type of tire 12 by which the lateral deflections $D_L$ measured during a revolution of a tire being tested can be used to determine the couple imbalance moments acting upon the tire. In the typical case, each couple moment-lateral deflection correlation factor $M_{CF}$ will be expressed as a number of inch-pounds or in-ounces of couple imbalance moment per so many thousands of an inch of lateral deflection. Note that these factors only determine the net moment at an angular location on the circumference of the tire. As a smaller mass non-uniformity at two inches from tread centerline can cause the same moment as a larger mass non-uniformity at one inch from tread centerline, both non-uniformities are indistinguishable from each other by the method of the present invention.

Figure 4:
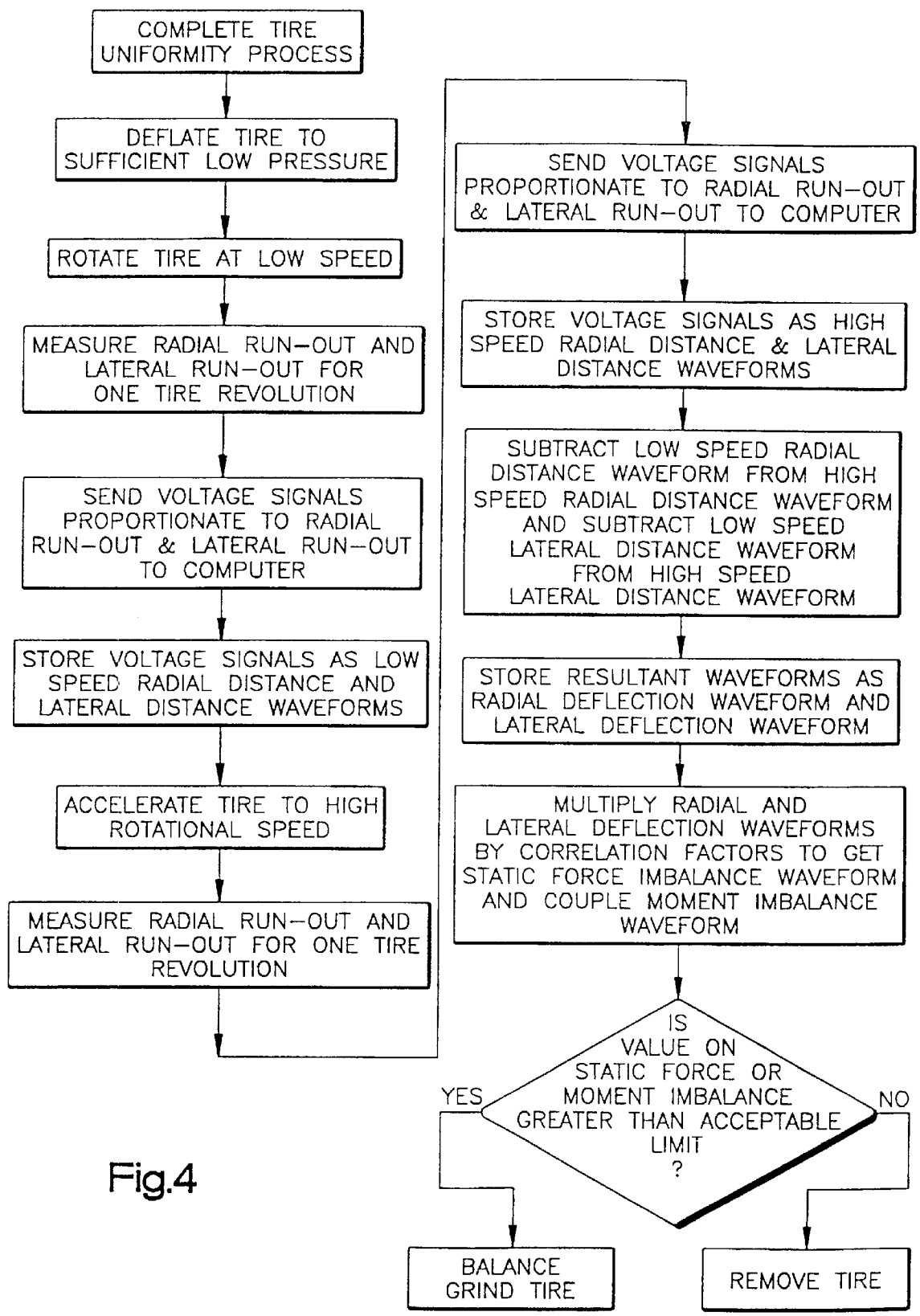
FIG. 4 illustrates a flow diagram of the operation of balance checking.
Figure 5:
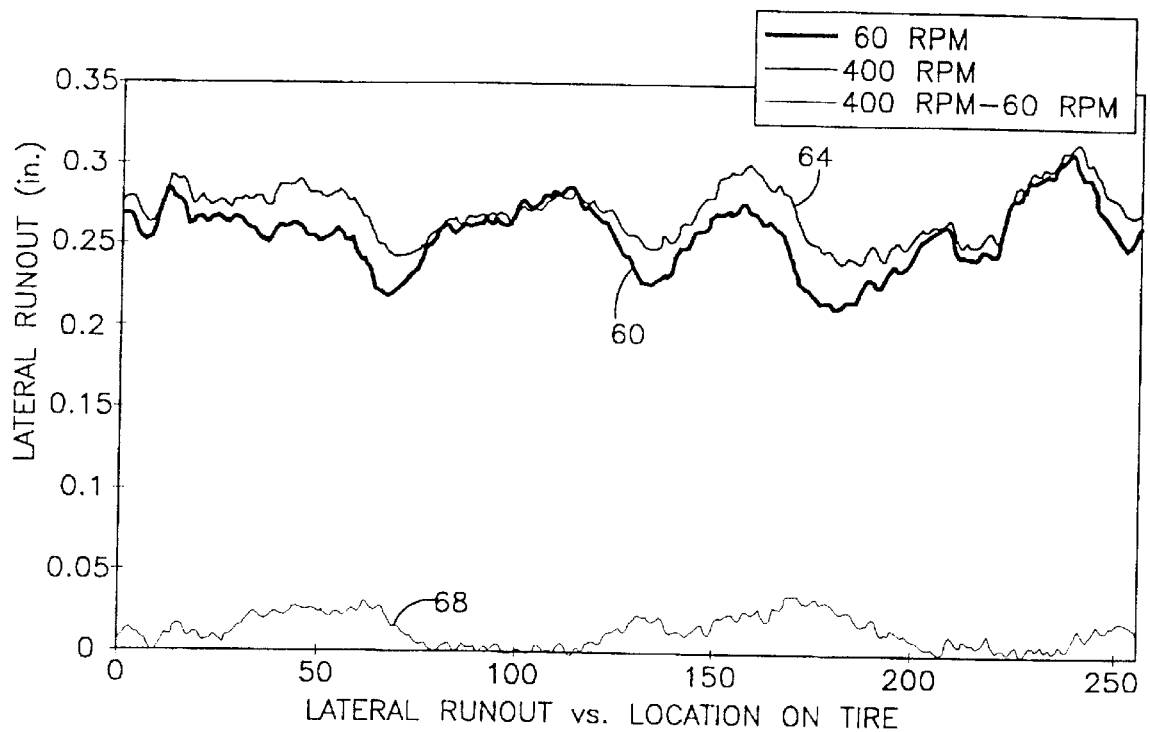
FIG. 5 is a graph depicting radial run-out at high speed, radial run-out at low speed and the differential between the radial run-out at high speed and low speed.
Figure 6:
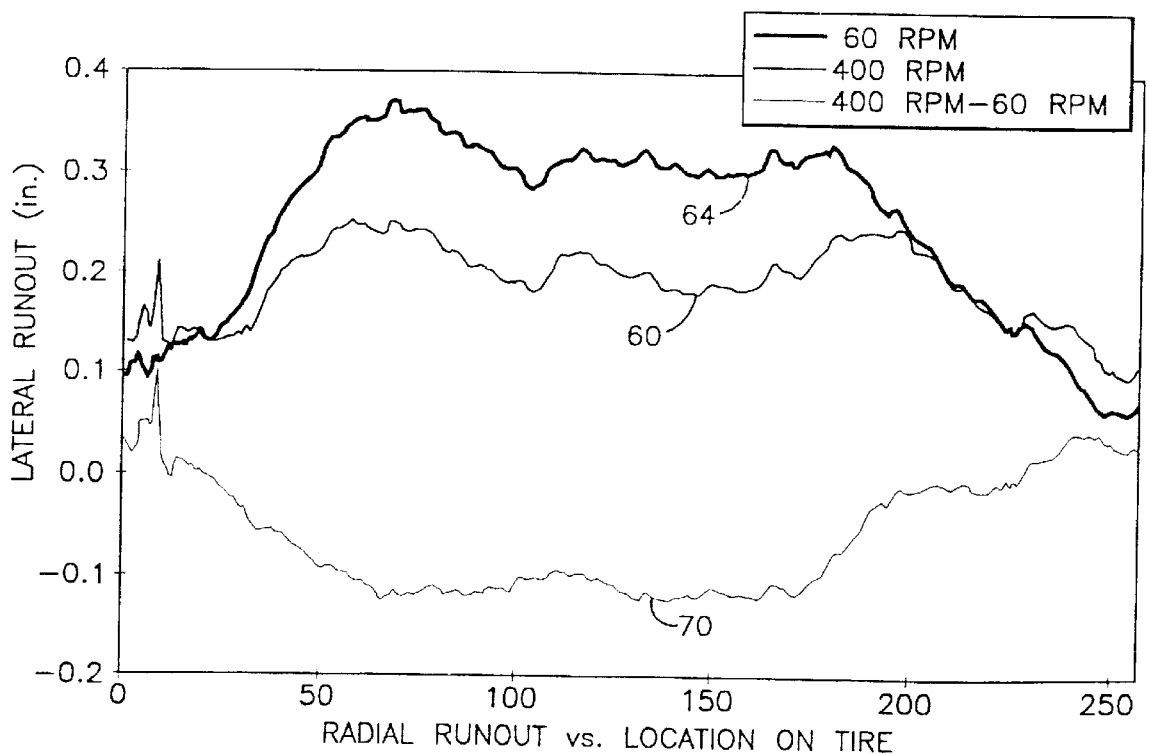
FIG. 6 is a graph of low speed and high speed depicting lateral run-out at high speed, lateral run-out at low speed and the differential between the high speed and low speed lateral run-out.

The routine for balance screening a pneumatic tire mounted on a low speed tire uniformity machine 10 is shown in the flow diagram of FIG. 4. First, a tire which has undergone any necessary grinding in the tire uniformity process is completely deflated from the pressure required for the correction process or deflated to an internal pressure sufficient only to maintain the shape of the tire, i.e. up to about 10 pounds per square inch gage (psig). The tire 12 will be inflated to insure that it remains fully centered about the rim 14 of the tire uniformity machine 10. Still the low pressure will allow the tire to react to the imbalance forces. Next, the tire is brought to a designated low rotational speed, preferably less than about 100 rpm. Then, the radial run-out sensor 46 measures the radial distances R about the circumferential tread 13 for one revolution of tire 12. Concurrently, the lateral run-out sensor 48 measures the lateral distances L about a sidewall 15 for one revolution of tire 12. Referring to FIGS. 5 and 6, the voltage signal generated by the measurement of the radial distance $R_o$ is sent to computer 45 via electrical signal conditioner 47 and stored as a low speed radial run-out waveform 60 and the voltage signal generated by the measurement of the lateral distance $L_o$ is sent to the computer and stored as a low speed lateral run-out waveform 62. FIGS. 5 and 6 depict a low speed, radial run-out waveform 60 and a low speed lateral run-out waveform 62, respectively, which would be generated by a computer of a tire uniformity machine according to the present invention when a tire with mass non-uniformities is balance screened. Although the tire has some imbalance forces present at the low rotational speed, the amount of the imbalance forces and moments are not typically large enough to cause radial or lateral deflections, respectively, sufficient to be detectable by the radial and lateral run-out sensors 46 and 48, respectively. Therefore, each low speed waveform 60 and 62 is essentially a reference baseline which indicates the inherent radial and lateral run-outs of the tire and measures the actual dimensions about the tread and sidewalls.

Next, the tire is accelerated to a high speed, preferably between about 100 rpm and about 800 rpm. Then, the radial run-out sensor 46 again measures the radial distance R about the circumferential tread 13. Concurrently, the lateral run-out sensor 48 measures the lateral distance L about a sidewall 15, for one revolution of tire 12. Referring to FIG. 5, the voltage signal generated by the measurement of the radial distance R during the high speed rotation of the tire is sent to computer 45 and stored as a high speed radial run-out waveform 64. The voltage signal generated by the measurement of the lateral distance L during the high speed rotation of the tire is sent to computer 45 and stored as a high speed lateral run-out waveform 66, as shown in FIG. 6. As the centrifugal forces are proportional to the square of the angular velocity (using the formula $F=m\times\omega^2\times r$ as discussed in the Background of the Invention), the imbalance forces and moments present at the high rotational speed are significantly greater than the imbalance forces and moments at the low rotational speed. Thus, even small mass distribution non-uniformities will generate enough static imbalance force and couple imbalance moment to cause measurable radial and lateral deflections.

Figure 7:
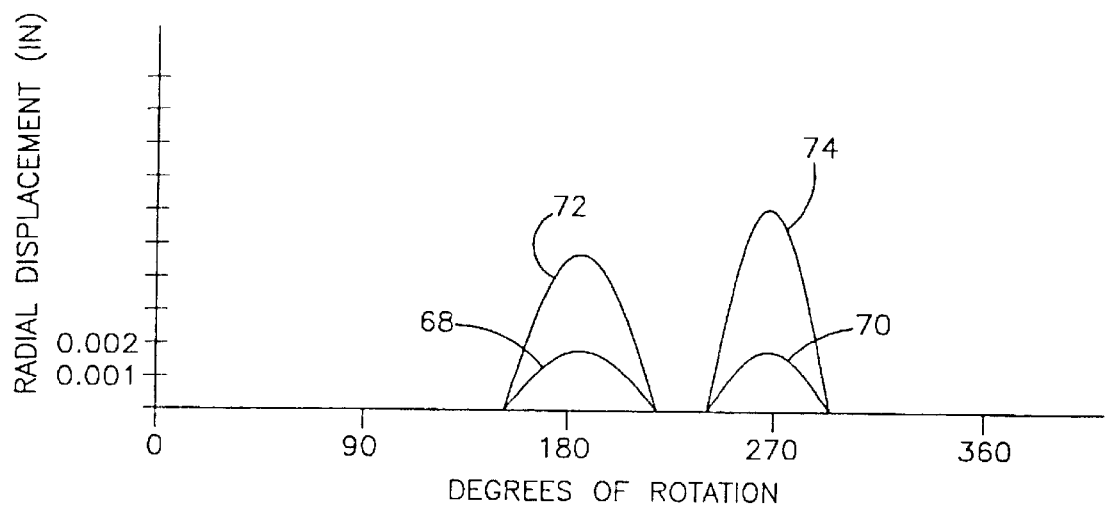
FIG. 7 is a graph of radial deflection waveforms and static imbalance force waveforms, correlating to the example tire balance check, to illustrate the method of balance.

Referring to FIGS. 4, 5, and 6, with the four waveforms 60, 62, 64, and 66 stored in the memory of computer 45, the computer then calculates the static imbalance forces and the couple imbalance moments acting on the tire 12. The computer mathematically operates on the waveforms by subtracting the low speed radial run-out waveform 60 from the high speed radial run-out waveform 64 to get a radial deflection waveform 68, as shown in FIG. 5. Computer 45 also subtracts the low speed lateral run-out waveform 62 from the high speed lateral run-out waveform 66 to generate a lateral deflection waveform 70, as shown in FIG. 6. Next, the computer 45 utilizes the static force-radial deflection correlation factor $F_{CF}$ to convert the radial deflection waveform 68 into a static imbalance waveform 72 and utilizes couple moment-lateral deflection correlation factor $M_{CF}$ to convert the lateral deflection wave form 70 into a couple imbalance moment waveform 74 as illustrated in FIG. 7. If all force and moment values on the static and couple imbalance waveforms, respectively, are less than or equal to an acceptable imbalance limit, then the tire 12 can be removed from the tire uniformity machine 10 and routed for any other necessary processing. If the any value of force on the static imbalance waveform 72 or moment on the couple imbalance waveform 74 exceeds a preset limit of acceptable imbalance, the computer 45 causes the tire 12 to undergo the method of balance correction outlined below. Furthermore, the data from this balance screening process can be stored for other future reference or analysis.

Figure 8:
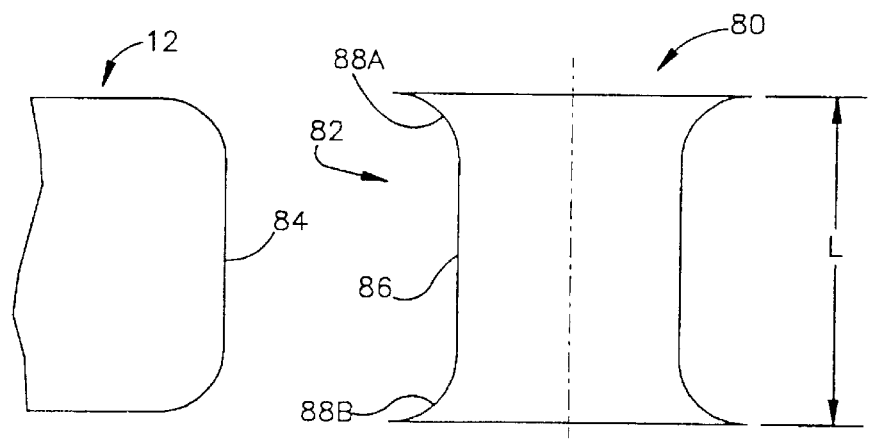
FIG. 8 is a side view of a full-faced grindstone, shown adjacent a partial side view of a tire.

While the method of screening a pneumatic tire to determine the imbalance of a tire with a tire uniformity machine is effective to save significant time and resources during the manufacture of the tires, it is within the scope of the present invention to correct for the imbalance of the tire by exposing the imbalanced tire to an additional grinding routine performed by the tire uniformity machine. In particular, the present invention is directed towards the further modification of the standard tire uniformity machine 10, already modified with balance screening capability as described above, by replacing grinding wheel 32 with a full-faced or omni-grinding wheel 80, as shown in FIG. 8. Full-faced grinding wheel 80 enables center grinder assembly 30 to grind both the central region of the tire tread and the shoulder regions, as desired. The corrective grinding routine of the present invention preferably employs full-faced grinding wheel 80 to remove the portions of the tire causing imbalance.

The method of correcting the imbalance of a pneumatic tire relies on the same principle as the method of measuring tire imbalance outlined above. As previously described, when the tire is rotated, points of mass non-uniformity are deflected either radially due to net centrifugal forces from static imbalance or laterally due to net moments from couple imbalance. Furthermore, as stated before, these effects are more pronounced at higher rotational speeds and more evident when the tire is at a state of low internal pressure which is just high enough to insure that the tire stays seated on the rim 14. Therefore, rotating an imbalanced tire at a high speed and inflated to a minimal internal pressure will cause the points of mass non-uniformity to be deflected further from the center of rotation than points where the tire mass is uniform, which in the case of balance correction, will expose the mass non-uniformities for corrective grinding.

To provide a tire uniformity machine 10, which has been modified to enable balance screening, the further ability of correcting tire imbalance, a full-faced, omni-grinding wheel 80 replaces the grind wheel 32 of center grinder assembly 30. An important feature of the preferred method for correcting the imbalance of a pneumatic tire with a tire uniformity machine is the selection of the shape of grinding wheel 80. As shown in FIG. 8, omni-grinding wheel 80 has a grinding face 82 with an axial length L which is at least as large, and preferably larger, than the width of tire 12. Contoured grinding face 82 is shaped so that a cross-section of wheel 80 is the inverse of the desired tire profile 84. This concave shape is essentially the tire mold-shape and has a central region 86 with a large radius and upper and lower fillet regions 88A,88B, typically with a smaller radius than the radius of the central region. With grinding wheel 80 being a full-faced grinding wheel, simultaneous grinding of shoulder and central tread regions of tire 12 is enabled. Therefore, any grinding interaction between tire 12 and grinding wheel 80 can remove mass non-uniformities of the tire at either the shoulder regions or the central region or both regions simultaneously. Although, in the preferred embodiment, grinding wheel 80 is a full-faced omni-grinding wheel, it is within the scope of the present invention to construct grinding wheel 80 so that grinding only occurs at the central tread region of tire 12, or to utilize shoulder grinder assembly 24 instead of central grinder assembly 30 so that grinding occurs only at the shoulder regions of the tire 12, if it desired to limit balance correction to specific regions of tire 12.

Figure 9:
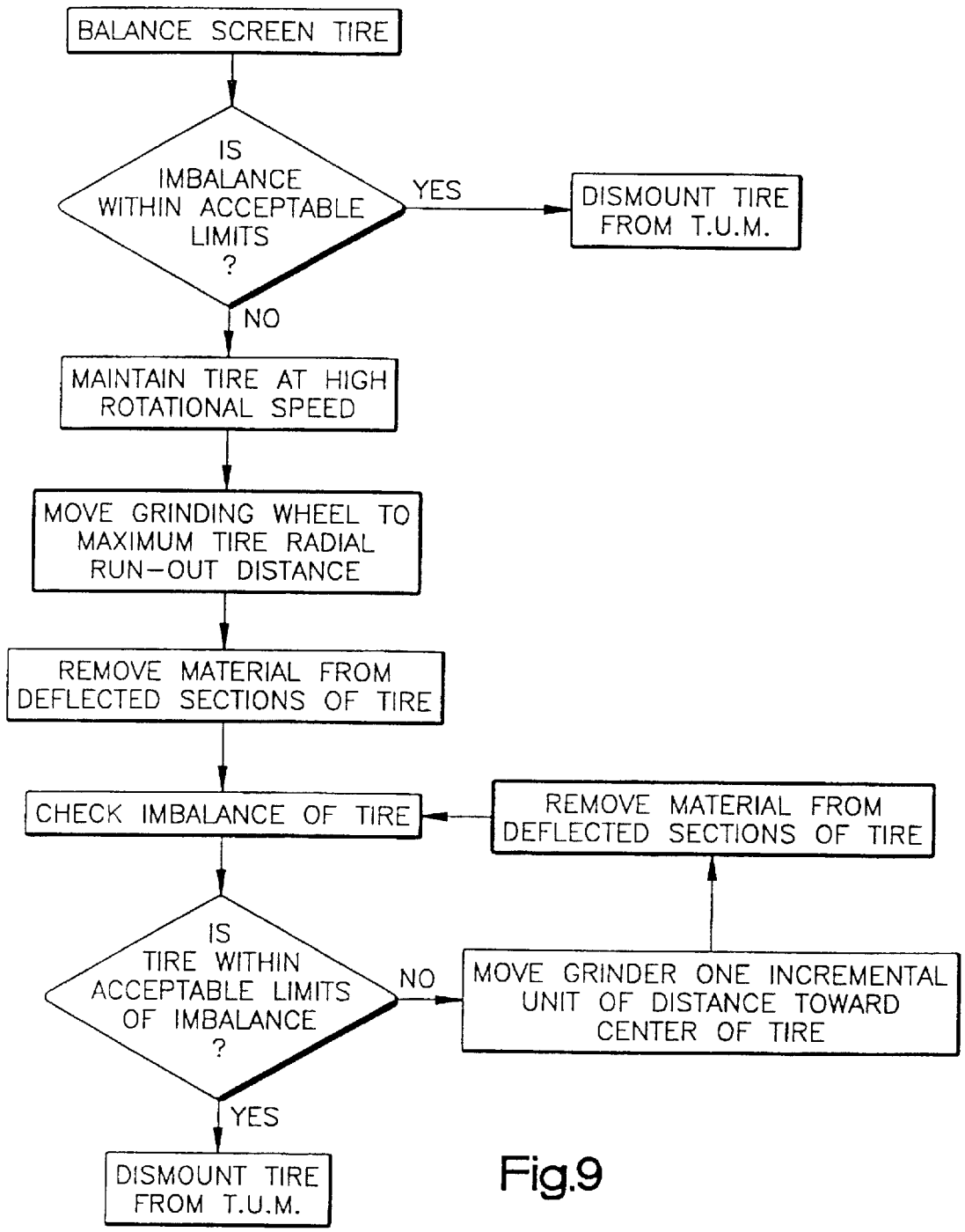
FIG. 9 illustrates a flow diagram of the balance correction routine of the present invention.
Figure 10A:
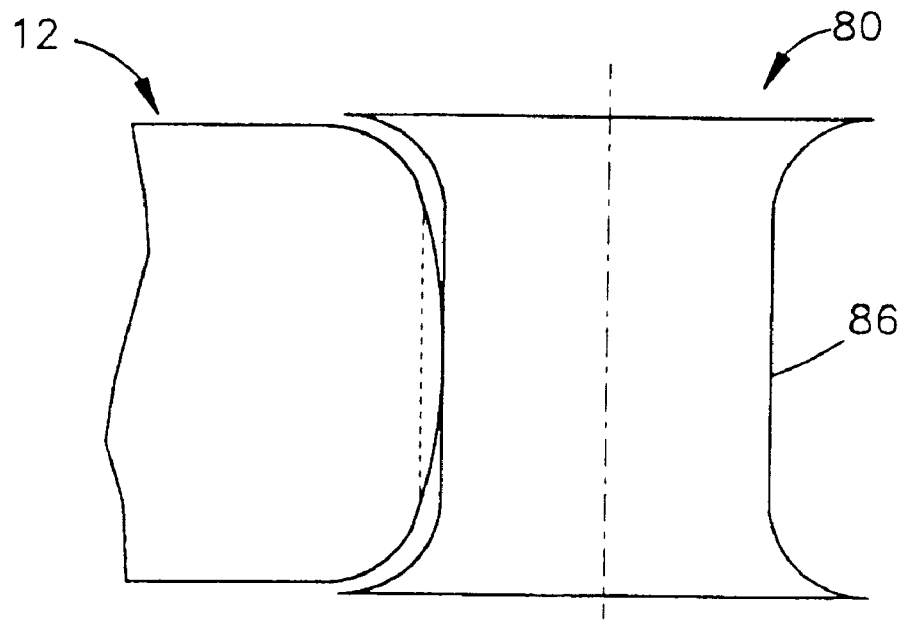
FIG. 10A is a side view of a tire undergoing balance correction to illustrate correction of static imbalance.
Figure 10B:
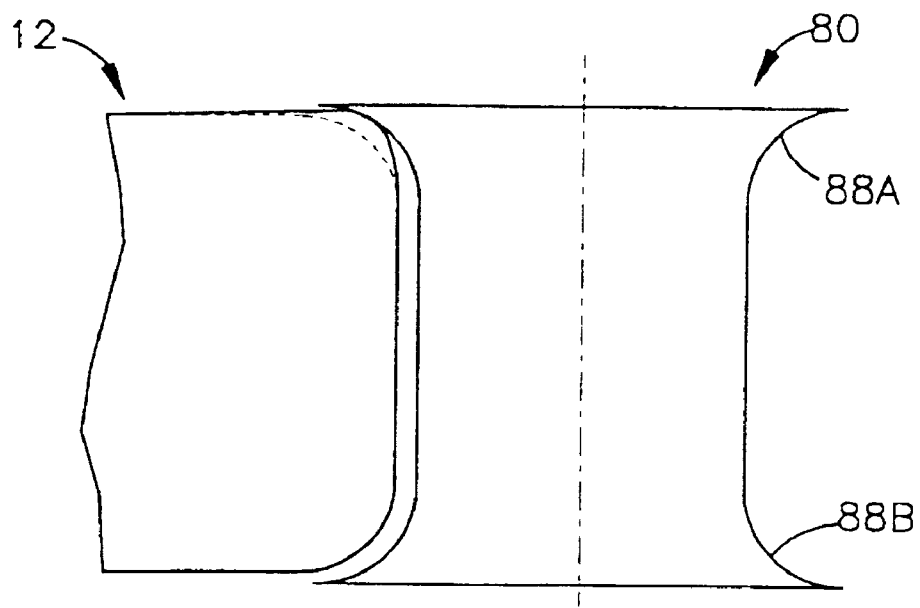
FIG. 10B is a side view of a tire undergoing balance correction to illustrate correction of couple imbalance.

The method of the present invention for correcting the imbalance of a tire on a tire uniformity machine 10, as outlined in FIG. 9, proceeds as follows. After a tire 12 has been balanced screened by the routine outlined above, a tire which has been found to have unacceptable imbalance is either returned to, or maintained at, the high rotational speed at which the balance screening was performed. Note that the tire pressure is deflated at this time to a minimum value so that the beads of the tire remain engaged with the rim 14. Then, using a control program in computer 45, grinding wheel 80 of grinder assembly 30 is positioned so that grinding face 82 is located at a distance from the center of tire 12 slightly less than the maximum radial run-out of the tire (i.e., the maximum distance from center caused by the largest deflection) as determined by the initial balance screen routine. Alternatively, grinding wheel 80 of center grinder assembly 30 could be advanced toward the center of tire 12 manually by an operator until any portion of tire 12 contacts the grinding wheel or the grinder could be advanced in incremental units of distance under control of the computer 45 until a sensor detects contact with the tire. As only an imbalanced tire will undergo this grind routine, the portions of the tire which contact the grinding wheel 80 at this position will be those portions which deflected radially or laterally due to the presence of mass non-uniformities. As grinding face 82 of grinding wheel 80 contacts the tire 12, material will be removed (i.e. ground) from the tire at the positions of mass non-uniformity. Referring to FIG. 10A, mass non-uniformities causing static imbalance will be deflected radially into contact with the central portion 86 of grinding face 82 of grinding wheel 80. As shown in FIG. 10B, mass non-uniformities causing couple imbalance will cause the tire 12 to be deflected laterally into either the upper or lower fillet sections 88A,88B of grinding face 84. After one or more rotations of the tire 12 at a particular position of center grinder assembly 30, all tire material which had been deflected into contact with the grinding wheel 80 at that incremental position will have been removed from the tire. Then, the radial and lateral deflections, and the respective forces and moments, are again determined by the routine for balance screening outlined above with the exception that low speed run-outs are not measured. In this and any other further balance check, the first radial run-out waveform and the first run-out distance waveform from the initial balance screening performed before the balance correction routine are utilized as a reference radial distance run-out and a reference lateral run-out waveform, respectively. If the result of this balance check is that tire 12 remains imbalanced beyond acceptable limits, grinder assembly 30 is then advanced an incremental unit of distance toward the center of tire 12 so that material is again removed at one or more deflected portions of the tire. Then, the balance of tire 12 is again checked after the removal of the material. The steps of incrementally advancing the grinder assembly 30, removing material from deflected portions of the tire 12, then balance checking the tire, are repeated until the tire is found to have an acceptable amount of imbalance.

Once the imbalance has been corrected to within acceptable limits of static and couple imbalance, the center grinder assembly 30 may then be backed away from tire 12 and the tire decelerated and removed from the tire uniformity machine 10.

TABLE I

BALANCE CORRECTIONS ON TIRE UNIFORMITY MACHINE

| Tire # | Grind | Static Force Grams | SS Dynamic Force Grams | OSS Dynamic Force Grams | Tangential Force Variation Newtons CW/CCW |
|---|---|---|---|---|---|
| 1 | Before | 102.1 | 56.7 | 45.4 | 61.6/36.0 |
|   | After | 113.4 | 60.1 | 49.9 | 60.0/41.0 |
| 2 | Before | 89.6 | 38.0 | 49.9 | 65.4/49.1 |
|   | After | 83.3 | 36.3 | 45.4 | 48.7/32.5 |
| 3 | Before | 34.0 | 16.4 | 19.8 | 79.0/44.3 |
|   | After | 27.2 | 11.9 | 14.7 | 71.6/11.2 |
| 4 | Before | 56.1 | 32.3 | 28.9 | 64.5/18.5 |
|   | After | 52.7 | 35.2 | 20.4 | 35.7/33.9 |

SS is serial sided, i.e. the inside facing surface of the tire
OSS is opposite serial sided, i.e, the outside facing surface of the tire
CW/CCW clockwise/counterclockwise The method of balance correction of the present invention was performed on four, substantially identical tires found to be imbalanced to confirm the effectiveness of this method, the results of which are shown in TABLE I above. The balance measurements of TABLE I indicate that small balance improvements occurred for three of the four tires, with only the characteristics of tire 1, which was heavily ground, showing an increase in imbalance.

A surprising effect was noticed when the ground tires were measured on the high speed tire uniformity machine. That is, the tangential force variations were also found to generally improve after the tires were ground to correct the imbalance. It must be noted that these tests were conducted with a centerline grindstone. It is believed that the substitution of a properly shaped omni-grinder with or without the use of shoulder grinders will result in overall and further improvement of tire characteristics.

It is apparent that there has been provided in accordance with this invention apparatus and methods for correcting the imbalance of pneumatic tires on a tire uniformity machine. The method of correcting the imbalance of pneumatic tires on a tire uniformity machine includes the steps of first balance screening the tire to determine the degree of tire imbalance, then incrementally grinding the imbalanced tire, and balance screening after each incrementally grind until the tire is within acceptable limits of imbalance. The advantage of this method is to reduce the number of tires that are scrapped for being outside the acceptable limits of imbalance. Another aspect of the invention is the ability to grind a tire on a tire uniformity machine to bring the tangential force variation to within a specified limit.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the scope of the appended claims.

We claim:

1. A method of correcting an imbalance of a pneumatic tire having a circumferential tire tread, comprising the steps of:

inflating said tire to a pressure of up to about 10 psig (0.70 kg/cm$^2$);

rotating said tire at a first speed about an axis of rotation so that sections of said circumferential tire tread are deflected radially outward from said axis of rotation of said tire;

positioning a tire grinder adjacent said circumferential tire tread so that said sections of said circumferential tire tread deflected radially outward contact said tire grinder; and removing material from said sections of said circumferential tire tread deflected radially outward with said tire grinder.

2. The method of claim 1 wherein the first speed is greater than about 100 rpm.

3. The method of claim 2 wherein said first speed is between about 100 rpm and about 800 rpm.

4. The method of claim 2 wherein said pneumatic tire is inflated to a pressure of about 2 psig (0.14 kg/cm$^2$) to about 10 psig (0.70 kg/cm$^2$).

5. The method of claim 4 further including the steps of:

a) measuring deflections of said sections of said circumferential tire tread deflected radially outward from said axis of rotation of said tire after said step of removing material from said tire tread;

b) comparing the measured deflections of said sections of said tire tread with an acceptable amount of deflection of said tire sections after said step of removing material; and c) advancing said tire grinder by incremental units of distance towards said axis of rotation of said tire to remove material from said sections deflected radially outward whenever said measured deflections are greater than said acceptable amount of deflection.

6. The method of claim 5 further including the step of repeating steps a) through c) until said measured deflections are less than said acceptable amount of deflection of said tire.

7. The method of claim 6 wherein said step of measuring the deflections of said sections of said circumferential tire tread deflected radially outward from said axis of rotation of said tire after said step of removing material from said tire further includes the steps of:

measuring low speed radial run-out of said sections of said circumferential tire tread at a second speed, less than said first speed, with a first sensor disposed adjacent said tire tread;

inputting a first signal from said first sensor corresponding to said low speed radial run-out at said second speed into a computer as a low speed radial run-out waveform;

measuring high speed radial run-out of said sections of said circumferential tire tread at said first speed with said first sensor;

inputting a second signal from said first sensor corresponding to said radial run-out at said second speed into said computer as a radial run-out waveform;

generating a radial deflection waveform corresponding to the difference between said radial run-out waveform and a reference radial run-out waveform; and comparing values of radial deflection represented in said radial deflection waveform with an acceptable value of radial deflection.

8. The method of claim 7 wherein said step of measuring radial deflections of said sections of said circumferential tire tread at a second speed includes the step of rotating said tire at a second speed of less than about 100 rpm.

9. The method of claim 7 further including the steps of:

measuring lateral run-out of a first lateral side wall of said tire along said axis of rotation while rotating said tire at said first speed;

positioning said tire grinder adjacent the first and second lateral side walls of said tire so that lateral run-out of said lateral side walls of said tire outward contact said tire grinder; and removing material from said first and second lateral sidewalls of said tire deflected laterally outward with said tire grinder.

10. The method of claim 9 further including the steps of:

a) measuring said lateral run-outs of said first lateral side wall of said tire after said step of removing said material from said first lateral sidewall of said tire;

b) comparing the measured run-outs of said first lateral sidewall after said step of removing said material with an acceptable amount of lateral run-out of said lateral sidewalls; and c) advancing said tire grinder by incremental units of distance towards said first and second lateral sidewalls of said tire to remove material from said first and second lateral sidewalls deflected laterally outward whenever said measured lateral outward run-outs is greater than said acceptable amount of lateral run-out.

11. The method of claim 10 further including the step of repeating steps a) through c) until said measured lateral run-outs are less than said acceptable amount of lateral run-out of said tire.

12. The method of claim 11 further including the step of converting said measured lateral run-outs of said first sidewall of said tire to couple imbalance of said tire.

13. The method of claim 11 wherein said step of measuring the lateral run-outs of said first lateral sidewall of said tire after said step of removing said material from said lateral sidewalls of said tire further includes the steps of:

measuring lateral run-outs of said first lateral sidewall of said tire at a second speed, less than said first speed, with a second sensor disposed adjacent said first lateral sidewall of said tire;

inputting a first signal from said second sensor corresponding to a reference lateral run-out at said second speed into a computer as a reference run-out waveform;

measuring said lateral run-outs of said first lateral sidewall of said tire at said first speed with said second sensor;

inputting a second signal from said second sensor into said computer as a lateral run-out waveform;

generating a lateral deflection waveform corresponding to the difference between said lateral run-out waveform and said reference lateral run-out waveform; and comparing values of lateral deflection represented in said lateral deflection waveform with an acceptable value of lateral deflection.

14. The method of claim 13 wherein said step of measuring lateral deflection of said first sidewall of said tire at said second speed includes the step of rotating said tire at a second speed of less than about 100 rpm.

15. The method of claim 14 wherein said step of removing material from said first and second lateral sidewalls of said tire by action of said grinder includes removing material with a center grinder with a full-faced grindstone.

16. The method of claim 14 wherein said step of removing material from said first and second lateral sidewalls of said tire by action of said grinder includes removing material with first and second shoulder grinders, each disposed adjacent one of said first and second lateral sidewalls.

17. The method of claim 5 further including the step of converting said measured deflections of said circumferential tire tread deflected radially outward from said axis of rotation of said tire to values corresponding to static imbalance of said tire.

18. A method of correcting an imbalance of a pneumatic tire having a circumferential tire tread, comprising the steps of:

inflating said imbalanced tire to a pressure of less than about 10 psig (0.70 kg/cm$^2$). rotating said imbalanced tire at a first speed about an axis of rotation of greater than about 100 rpm about an axis of rotation so that shoulder regions are deflected along said axis of rotation and central tread regions are deflected radially outward from the axis of rotation of said tire;

positioning a grinding face of a tire grinder at a distance from said axis of rotation less than the maximum radial run-out of said tire so that deflected shoulder and central tread regions of said tire will contact said grinding face; and removing material from said deflected shoulder and central tread regions of said tire with said tire grinder.

19. The method of claim 18 wherein said first speed is between about 100 rpm and about 800 rpm.

20. The method of claim 19 wherein said pneumatic tire is inflated to a pressure of about 2 psig (0.14 kg/cm$^2$) to about 10 psig (0.70 kg/cm$^2$).

21. The method of claim 20 further including the steps of:

a) measuring lateral deflections of said shoulder regions deflected along said axis of rotation and radial deflections of said central tread region deflected radially outward of said axis of rotation of said tire after said step of removing material from said tire;

b) comparing said measured lateral and radial deflections of said tire with an acceptable amount of lateral and radial deflections, respectively, after said step of removing material; and c) advancing said tire grinder by incremental units of distance towards said axis of rotation to remove additional material from said shoulder and central tread regions which are deflected laterally and/or radially outward whenever said measured deflections are greater than said acceptable amount of deflection.

22. The method of claim 21 further including the step of repeating steps a) through c) until said measured deflections are less than said acceptable amount of deflection of said tire.

23. The method of claim 18 wherein said step of removing material includes the step of removing material with a center tire grinder having a full-faced grindstone.

24. The method of claim 18 wherein said step of removing material from lateral sidewalls of said tire includes the step of removing material with first and second shoulder grinders, each disposed adjacent one of said first and second lateral sidewalls.

25. A method of reducing tangential force variations of a pneumatic tire having a circumferential tire tread, comprising the steps of:

rotating said tire at a first speed of greater than about 100 rpm about an axis of rotation so that sections of said circumferential tire tread are deflected radially outward from said axis of rotation of said tire;

positioning a tire grinder adjacent said circumferential tire tread so that said sections of said circumferential tire tread deflected radially outward contact said tire grinder; and removing material from said sections of said circumferential tire tread deflected radially outward with said tire grinder.

26. The method of claim 25 including the step of inflating said pneumatic tire to a pressure of less than about 10 psig (0.70 kg/cm$^2$) prior to rotating said tire at said first speed.

27. The method of claim 26 further including the steps of:

a) measuring deflections of said sections of said circumferential tire tread deflected radially outward from said axis of rotation of said tire after said step of removing material from said tire tread;

b) comparing the measured deflections of said sections of said tire tread with an acceptable amount of deflection of said tire sections after said step of removing material; and c) advancing said tire grinder by incremental units of distance towards said axis of rotation of said tire to remove material from said sections deflected radially outward whenever said measured deflections are greater than said acceptable amount of deflection.

28. The method of claim 27 further including the step of repeating steps a) through c) until said measured deflections are less than said acceptable amount of deflection of said tire.

* * * * *